United States Patent [19]
Thomas et al.

[11] Patent Number: 6,019,511
[45] Date of Patent: Feb. 1, 2000

[54] PROTECTIVE ASSEMBLIES

[75] Inventors: Paul E. Thomas, Terre Haute, Ind.; Michael A. Francis, Midlothian, Va.

[73] Assignee: Tredegar Industries, Inc., Richmond, Va.

[21] Appl. No.: 08/155,522

[22] Filed: Nov. 22, 1993

[51] Int. Cl.[7] .......................... B65D 30/08; B29D 22/00
[52] U.S. Cl. ...................... 383/113; 383/101; 426/118; 428/35.2; 428/132; 428/138
[58] Field of Search ................ 229/2.5 R; 383/101, 383/102, 109; 428/132, 138, 131, 35.2, 35.3, 35.4; 426/124

[56] References Cited

U.S. PATENT DOCUMENTS

| | | | |
|---|---|---|---|
| 3,127,828 | 4/1964 | Fine | 99/446 |
| 3,156,402 | 11/1964 | Dupuis | 229/30 |
| 3,253,762 | 5/1966 | Gaunt | 229/2.5 R |
| 3,264,120 | 8/1966 | Westcott | 229/2.5 R |
| 3,346,400 | 10/1967 | Roesner | 99/174 |
| 3,428,103 | 2/1969 | Walsh | 150/2 |
| 3,628,720 | 12/1971 | Schmedding | 383/101 |
| 4,058,214 | 11/1977 | Mancuso | 206/545 |
| 4,150,186 | 4/1979 | Kazama | 428/138 |
| 4,170,302 | 10/1979 | Baca | 206/545 |
| 4,360,118 | 11/1982 | Stern | 220/4 |
| 4,373,636 | 2/1983 | Hoffman | 206/551 |
| 4,376,558 | 3/1983 | Bandar | 312/259 |
| 4,470,153 | 9/1984 | Kenan | 383/102 |
| 4,497,406 | 2/1985 | Takanashi | 206/438 |
| 4,535,020 | 8/1985 | Thomas et al. | 428/131 |
| 4,550,546 | 11/1985 | Raley et al. | 383/101 X |
| 4,578,814 | 3/1986 | Skamser | 383/99 |
| 4,702,377 | 10/1987 | Gröne | 206/557 |
| 4,707,883 | 11/1987 | Irani et al. | 16/110 |
| 4,717,069 | 1/1988 | Pizzolato | 229/104 |
| 4,765,534 | 8/1988 | Zion et al. | 229/109 |
| 4,785,968 | 11/1988 | Logan et al. | 220/410 |
| 4,802,233 | 1/1989 | Skamser | 383/15 |
| 4,848,543 | 7/1989 | Doboze | 206/45.32 |
| 4,861,632 | 8/1989 | Caggiano | 383/109 X |
| 4,923,725 | 5/1990 | Zafiroglu | 428/36.4 |
| 4,927,010 | 5/1990 | Kannankeril | 206/204 |
| 4,935,276 | 6/1990 | Pawlowski et al. | 428/35.7 |
| 4,935,282 | 6/1990 | Pawlowski et al. | 428/121 |
| 4,953,550 | 9/1990 | Dunshee | 383/102 |
| 5,132,151 | 7/1992 | Graney | 428/36.92 |
| 5,273,361 | 12/1993 | Jillson | 383/109 |
| 5,346,312 | 9/1994 | Mabry et al. | 383/101 X |

FOREIGN PATENT DOCUMENTS

| | | | |
|---|---|---|---|
| 404128166 | 4/1992 | Japan | 426/124 |

OTHER PUBLICATIONS

Brochure entitled "Fabric Insulation", published by Thermal-R Corporation, Middlesex, NJ, 1988.

Sample of "Albertsons" Hot Sak storage bag, manufactured by Flexo Transparent Co. of Buffalo, NY, which utilizes assignee's "VISPORE" film on inside surface, mid-1993.

*Primary Examiner*—Jes F. Pascua
*Attorney, Agent, or Firm*—Emch, Schaffer, Schaub & Porcello Co., L.P.A.

[57] ABSTRACT

A protective assembly may be, for examples, a rectangular blanket or pad placed over or under an object to be insulated or a bag or pouch which receives an object. The protective assembly includes at least one and preferably two inner layers and a solid outer layer. The inner layer has a plurality of interconnected funnels. The funnels each have a small end and a large end. An opening is defined by each funnel in the inner layer adjacent the large end. The small end of the funnel extends toward the outer layer. The funnels space the layers apart. The funnels form a dead airspace while trapping condensate which may be harmful to the object being protected by preventing liquid from being forced upon the object. The protective assembly substantially eliminates the possibility that condensation will drop upon the object or be forced by pressure into contact with the object.

34 Claims, 4 Drawing Sheets

PROTECTIVE ASSEMBLIES

BACKGROUND OF THE INVENTION

The present invention is directed to protective assemblies for food and non-food objects. The assemblies are designed to preserve food products, such as pizza, and also can be used in other fields such as the packaging of boiled or steamed medical instruments and the packaging of mechanical or electrical parts which have been washed in a hot solvent bath as an intermediate step prior to packaging.

When materials or objects are heated or washed in a hot bath, if not used immediately after being prepared, they often must be protected in some way as they are stored and/or transported to their destination. In the case of food stuffs which are cooked by heating, it is important that the protective container assembly protect the quality and cleanliness of the prepared food stuffs.

When food stuffs are cooked by any of several means, including microwave energy, boiling, steaming, frying and deep frying, the primary intent is to kill any latent bacteria and convert the food stuff from a "raw" product to a "cooked" product. Often when the cooking process is completed, the food stuff gives off residual liquids and volatiles. The most common liquids which exude are greases, oils and water while the most common volatile is moisture vapor.

Moisture vapor, such as steam, is lighter than air and moves upwardly while the liquids, being influenced by gravity, normally move downwardly.

When one refers to the "quality" of a cooked food, it generally implies that the food should be hot and contain the proper amount of moisture. If it is too cold, too soggy or too dry, it is viewed to have less than the desired quality. If the food stuff cannot be served immediately after cooking, and is not properly protected, the juices and condensate can contact it and cause it to become soggy. If the steam vapors are vented away too rapidly and the food stuff becomes cold, then it also does not maintain the desired quality when served. Additionally, a protective container assembly must protect the food stuffs from outside sources of contamination if the food stuffs are to be handled and transported.

U.S. Pat. No. 4,707,883 discloses an envelope made from a composite material where a foamed polyethylene is positioned between two layers of the polyethylene film. While this type of prior art structure tends to retard heat loss, it does not solve the moisture problem which results from condensation. With respect to pizzas specifically, if the steam leaving the pizza is allowed to condense, it is possible that the container will become damp and condensed water droplets will fall back on the pizza resulting in an unappetizing product.

U.S. Pat. No. 4,058,214 attempts to solve the steam condensation problem by venting the overall carrying and insulating enclosure. However, steam venting allows much of the heat to escape, thus lowering the temperature of the object being carried.

Other prior art patents also disclose protective assemblies for protecting cooked food. Grease absorbing underpads are disclosed in U.S. Pat. Nos. 4,923,729, 4,935,276 and 4,935,282.

U.S. Pat. No. 4,861,632 discloses a laminated bag which is a multilayered structure. Each side of the bag includes an apertured inner sheet having a plurality of perforations, an outer moisture impervious thermoplastic film sheet and an absorbent layer interposed between the two sheets. The absorbent layer is disclosed as preferably consisting of sheets of paper toweling. The inner apertured sheet is a flat film which allows for the entrance of either fluids or vapors. When the food rests on this assembly, the composite assembly may become saturated with fluids. Because the weight of the food stuff sits on the underpad and because there is no distance between the food stuff and the fluid which is directly aligned with the apertures, the pressure can squeeze the fluids out of the absorptive middle layer, through the apertures and back into the food stuff. Likewise, on the upper layer of the prior art laminated bag, if the fluids created by the gathering together of the condensed vapors, achieve a point where their weight, as pulled by gravity exceeds the force of the capillary action of the fibrous absorptive middle layer holding them in check, they can fall downwardly through the apertures to the food stuff.

The primary object of the present invention is to provide a protective assembly, and specifically a protective container assembly which retards condensate from the upper section from moving downwardly into the food stuff and similarly retards liquid from being forced by pressure upwardly through apertures into the food stuff.

SUMMARY OF THE INVENTION

The present invention is directed to protective container assemblies in the forms of protective absorbing pads, insulative pads or blankets and insulative bags or pouches. The protective container assemblies, according to the present invention, not only limit heat transfer but also entrap condensed moisture such that it is substantially prevented from returning to the object. In addition, the protective absorbing pads protect and enhance the objects by allowing drainage and entrapment of excessive fluids.

A protective container assembly, according to the present invention, includes at least one inner film layer and a solid outer layer. The outer layer has a continuous surface and the inner layer has a plurality of interconnected funnels. The funnels extend outwardly from the surface of the inner layer and space the layers apart. The plurality of interconnected funnels define a plurality of fluid containment pockets which, for example, contain condensate preventing its return to the object and maintains a space or distance between the object and the liquids which have drained through the interconnecting funnels such that the liquids are substantially prevented from being forced or squeezed into contact with the object or objects.

In some embodiments, a plurality of layers are utilized. The plurality of inner layers include the plurality of interconnected funnels which, preferably are spaced in a manner that the openings in the funnels are not aligned, therefore, restricting passage of condensate or other liquids through the apertures to the objects.

At least one of the inner layers is constructed of a prior art film which is sold under the trademark VISPORE® by the assignee of the present application. Preferably, at least two of the inner layers are constructed of the "VISPORE" film. This "VISPORE" film is a thermoplastic film, such as a polyethylene film, which includes a plurality of interconnected "funnels". An embodiment of "VISPORE" film is disclosed in U.S. Pat. No. 4,535,020, owned by the present assignee. The term "funnel", as used in present specification means a hollow member or conduit having an opening at one end larger than the opening at the other end. The large end of the funnel is generally in the plane of the film and the smaller end of the funnel extends outwardly from the plane of the film. This inner film layer, having the plurality of interconnected funnels, spaces other layers from the object, for example a food product. The inner film layer is generally between 0.5 mil to 65 mil in thickness. A preferred thickness range is between 5 mil and 45 mil. A most preferred layer thickness is 35 mil.

The density of the funnels may range from 1 per square inch to as high as nearly 150,000 per square inch. In the preferred embodiment, the density is approximately 88 funnels per square inch. The side walls of the funnels have a thickness of between 0.2 mil and 15 mil with a preferred nominal thickness of 1.75 mil.

While a protective assembly, according to the present invention is effective with only one inner layer, having the integral funnels, together with one solid outer layer, the advantages of the invention increase if at least two inner layers having the integral funnels are used together with a solid outer layer. The two inner layers are positioned so that the centerlines of the funnels are normally not aligned as steam or liquid passes through the first layer. Therefore, the paths are torturous. If condensation is formed on the inside of the outer layer, it has been found that water droplets normally drop vertically downwardly. Because the centerlines of the funnels are normally not aligned and because the small end of the funnels extend outwardly toward the outer layer, it is unlikely that water droplets will find their way back to the object positioned either under or within the protective assembly.

DETAILED DESCRIPTION OF THE PREFERRED EMBODIMENTS

Figure 1:
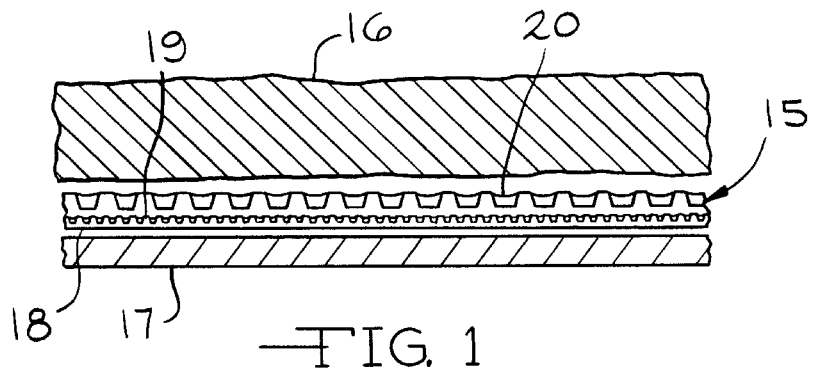
FIG. 1 is a fragmentary cross-sectional view of a protective absorbing pad, according to the present invention, positioned beneath a portion of pizza within a cardboard container.

A protective absorbing pad, according to the present invention, is generally indicated by the reference number 15 in FIG. 1. The protective absorbing pad 15 is positioned below a pizza 16 which is within a cardboard box having a bottom 17.

Figure 2:
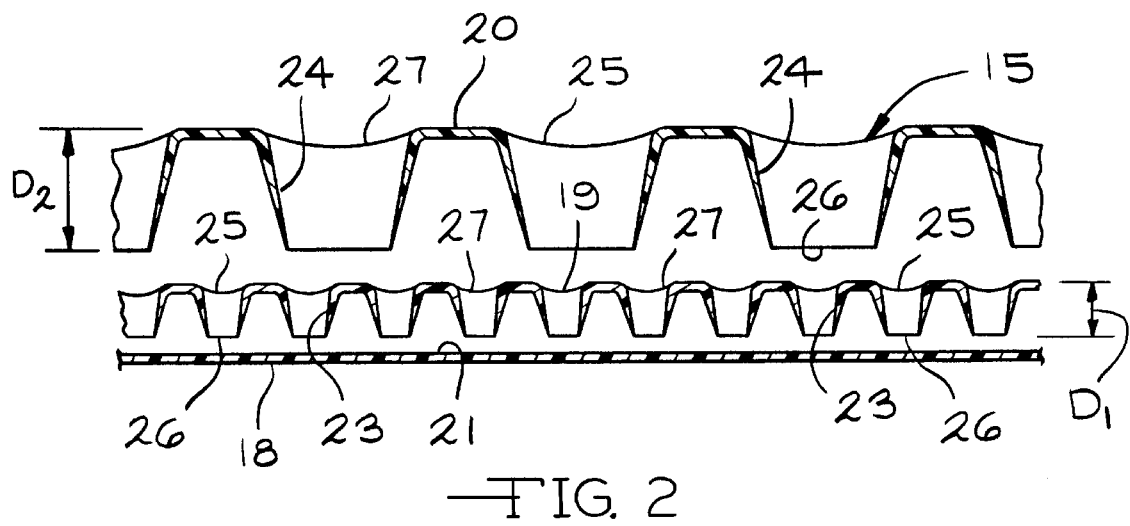
FIG. 2 is an enlarged fragmentary cross-sectional view of the protective absorbing pad shown in FIG. 1.

An enlarged view of the protective absorbing pad 15 is shown in FIG. 2. The pad 15 includes a nonporous exterior film ply or solid outer layer 18 and porous interior film plies or inner layers 19 and 20. The outer layer 18 is constructed of a thermoplastic material, specifically a solid polyethylene film. Other thermoplastic materials may be utilized including polyesters, polypropylenes, nylons and several other engineered plastics. Ethylene vinyl acetates may also be utilized, however, it is normally preferable to coextrude the ethylene vinyl acetates with another thermoplastic material such as a thermally stable polyethylene. The outer layer 18 has a continuous surface 21 and has a thickness range of between 0.2 mil and 20 mil, with a preferred thickness of approximately 2.5 mil.

The inner layers 19 and 20 are preferably constructed of known prior art films sold under the trademark VISPORE®. Each of the inner layers 19 and 20 is constructed of a polyethylene film which defines a plurality of interconnected protuberances or funnels 23 and 24.

In the FIG. 2 embodiment, the inner layer 20 is an 8 mesh layer, having approximately 88 funnels per square inch, while the inner layer 19 is a 20 mesh layer, having approximately 400 funnels per square inch. The average wall thickness of the layers 19 and 20 is 1.75 mil with a range from 0.5 mil to 15.0 mil. The funnels 23 and 24 include a large end 25 and a small end 26. Openings 27 are defined in the inner layers 19 and 20 adjacent the large ends 25 of the funnels 23 and 24. The small ends 26 extend away from the large ends 25 predetermined distances $D_1$ and $D_2$. The distances $D_1$ and $D_2$ are sufficient to space, for example the pizza 16 from the outer layer 18. As shown in FIG. 2, the outer layer 18 is spaced from the inner layers 19 and 20 and from the funnels 23 and 24 to form a vacant fluid reservoir or vacant space for receiving gas and liquid from, for example, the pizza 16. The openings 27 empty into the vacant space. Any liquid, such as grease, from the pizza 16 moves downwardly through the openings 27 in the inner layers 19 and 20 through a torturous path. The spacing by the funnels 23 and 24 ensure that if pressure is placed on the pizza 16, any liquid, such as grease which is in the overall protective absorbing pad 15, is not returned into the object or food stuff such as the pizza 16. The range of predetermined distances $D_1$ and $D_2$ are both 5 mils to 100 mils. The preferred predetermined distance $D_1$ is 20 mils, while the preferred predetermined distance $D_2$ is 50 mils.

When fluid from an object, not shown, passes through the openings 27 in the funnels 23 and 24 a torturous path is provided by these openings. The layer 18 stops fluid when it reaches the surface 21. The funnels 23 and 24 space the inner layers 19 and 20 and thereby entrap any liquid. The liquid is prevented from contacting the pizza 16.

Figure 3:
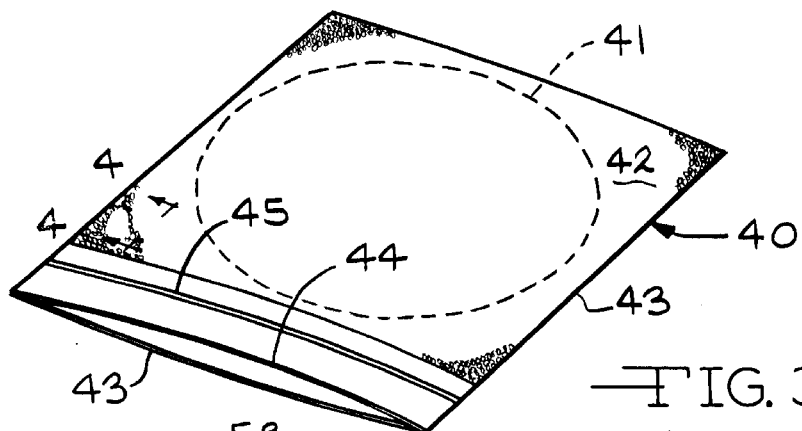
FIG. 3 is a perspective view of a protective pouch, according to the present invention.

A protective container assembly, according to the present invention, is generally indicated by the reference number 40 in FIG. 3. The protective assembly 40 has a bag or pouch configuration forming a product compartment and the object to be insulated is shown in dash lines at the reference number 41. The protective assembly 40 includes opposed walls 42 and 43 which are joined together on three edges and have an opened upper end 44. Closure means, in this case, an airtight closure strip 45 is provided at the end 44 to open and close the insulative protective assembly 40 for insertion or removal of the object 41.

The bag or pouch 40 may be constructed in various shapes with differing closures and fall within the scope of the present invention. For example, closure means can include a mechanical closure or an adhesive closure. The end of the pouch 43 opposite the closure strip 45 may be folded over.

The geometrical shapes of the pouch 43, in addition to being rectangular, include other shapes such as triangular and various polygonal shapes. In addition, the pouch 43 is not necessarily flat, but can include a curvature or multiple curvatures.

Figure 4:
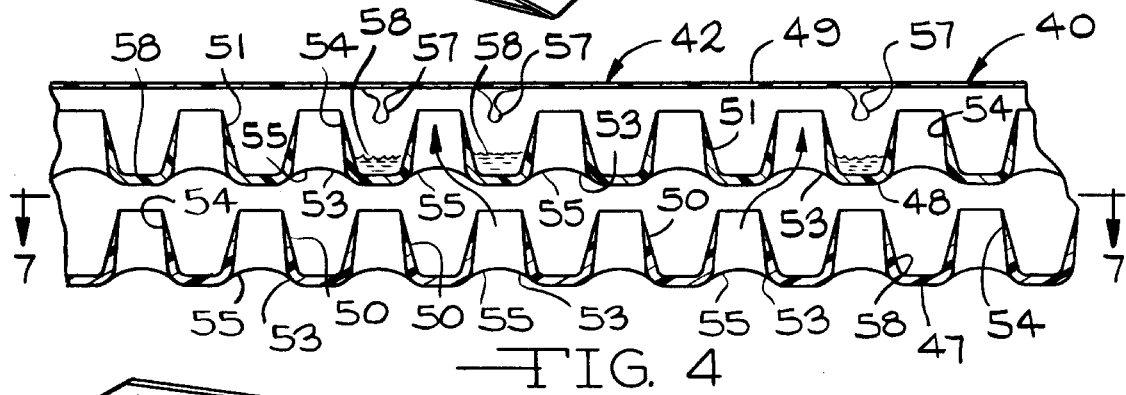
FIG. 4 is a fragmentary cross-sectional view taken along the line 4—4 of FIG. 3.

An enlarged view of the wall 42 is shown in FIG. 4 and illustrates a preferred embodiment of the present invention. In the preferred embodiment, the insulative protective assembly 40 includes an inner layer 47, a second inner or middle layer 48 and a solid outer layer 49. The layers 47 and 48 are constructed of a thermoplastic material, such as a polyethylene film. Similarly, the solid outer layer 49 is also constructed of a thermoplastic material, such as a polyethylene, a polyester or a polypropylene.

The inner layers 47 and 48 are preferably constructed of "VISPORE" films. Each of the layers 47 and 48 defines a plurality of inner connected funnels 50 and 51. In the present embodiment, there are 88 funnels per square inch in the inner layers 47 and 48, however, arrangements having higher or lower densities of funnels may be utilized and still fall within the scope of the present invention. While the average thickness of the layers and the "side walls" of the funnels is 1.75 mil, thicknesses ranging from 0.5 mil to 15.0 mil can be used successfully in any or all of the layers 47, 48 and 49.

The funnels 50 and 51 include a large end 53 and a small end 54. Openings 55 are defined in the inner layers 47 and 48 adjacent the large ends 53 of the funnels 50 and 51. The small ends 54 extend away from the large ends 53 toward the solid outer layer 49. As shown in FIG. 4, the outer layer 18 is spaced from the inner layers 47 and 48 and from funnels 50 and 51 to form a vacant fluid reservoir or vacant space for receiving gas and liquid from, for example, the object 41. The openings 55 empty into the vacant space. As shown by the arrow in FIG. 6, if steam or other vapor escapes from the object 41, it passes along a torturous path through the funnels 50 and 51 defined by the inner layers 47 and 48. If the steam or other vapor condenses on the inner side of the outer layer 49 as indicated by droplets 57, the liquid tends to drop downwardly and is contained by pockets 58 defined between the funnels 50 and 51 and the inner layers 47 and 48. The staggering of the funnels 50 and 51 substantially prevents the passage of condensed liquid droplets 57 through the funnels 50 and 51 where they could reach the object 41 being insulated.

Figure 7:
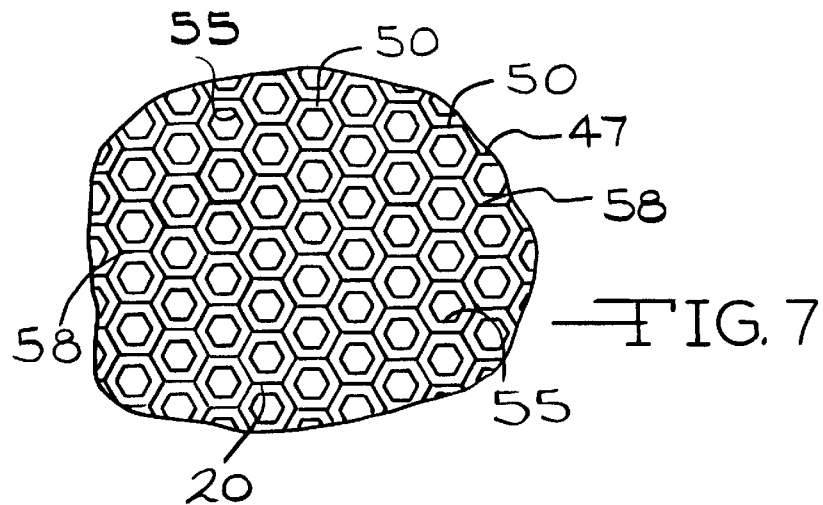
FIG. 7 is a fragmentary plan view of a preferred inner layer of a protective assembly taken along the line 7—7 of FIG. 4.

Referring to FIG. 7, a partial plan view is shown of the inner layer 47. It should be noted that the funnels 50 have a hexagon shape and also define hexagon-shaped openings 55. The funnels 50 and other funnels can have various cross-sections and configurations. For example, the terms tubular protuberances or funnels include nonconical shapes, conical shapes, tubular shapes and other configurations including hexagonal cross sections.

Figure 5:
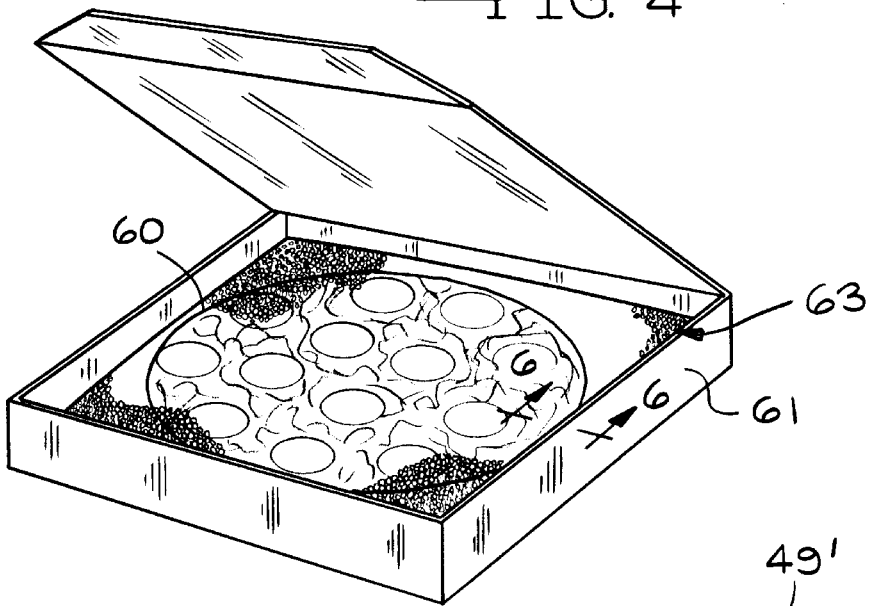
FIG. 5 is a perspective view of a protective insulating blanket, according to the present invention, positioned on a pizza in a box.

Another embodiment of the present invention is shown in FIG. 5. A pizza is generally indicated by the reference number 60 and is positioned within a container 61. While the container 61 in the present embodiment is indicated as a rectangular cardboard container, in other embodiments, the pizza containers do not have tops and often comprise corrugated support with sides which are, for example, positioned within a paper bag.

Figure 6:
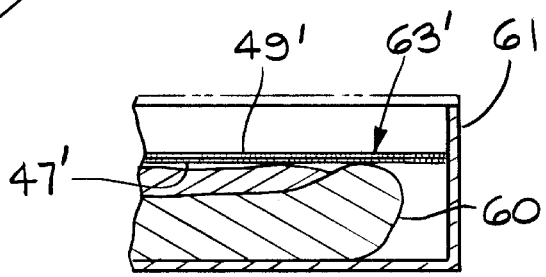
FIG. 6 is a fragmentary cross-sectional view taken along the line 6—6 of FIG. 5.

In the embodiment shown in FIGS. 5 and 6, a protective container assembly and more specifically a protective insulative assembly, according to the present invention, is generally indicated by the reference number 63. The protective assembly 63 is an insulative blanket, as opposed to the pouch 40, shown in FIG. 4. While the protective insulative blanket assembly 63 is used with the pizza 60, it can, of course, be used for many other insulative and moisture trapping applications. The protective insulative assembly 63 includes a single inner funnel layer, indicated by the reference number 47'. Similarly, the protective insulative assembly 63 includes a solid outer layer indicated by the reference number 49'. The inner layer 47' is similar in construction to the inner layer 47 shown in FIG. 4 and the outer layer 49' is similar in construction to the outer layer 49 shown in FIG. 4. The inner layer 47' and the outer layer 49' are generally rectangularly shaped and are joined, for example by heat sealing at their outer edges to form the unitary and composite protective insulative assembly 63.

Figure 8:
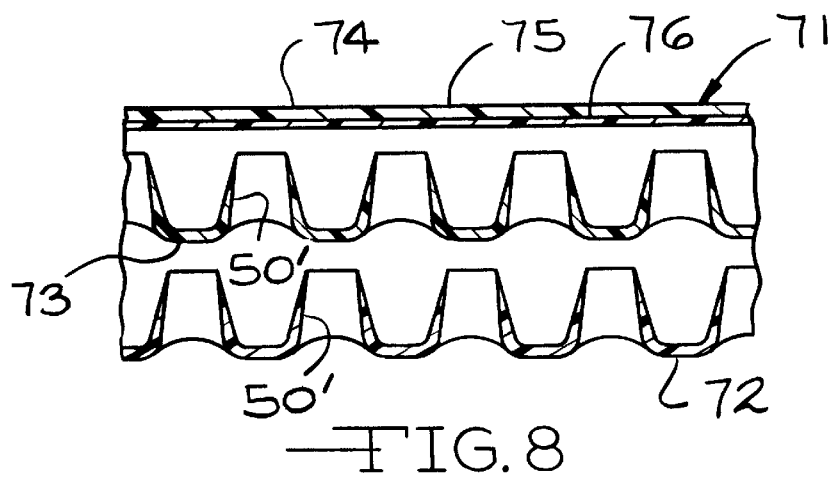
FIG. 8 is a fragmentary view similar to FIG. 4 and showing another embodiment of a protective assembly according to the present invention.
Figure 9:
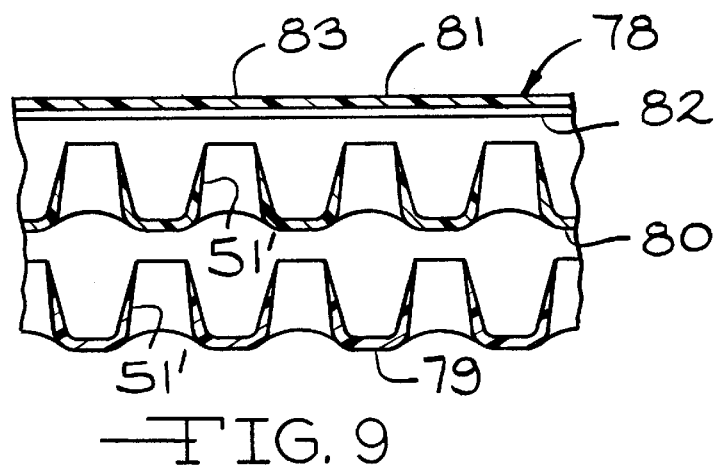
FIG. 9 is a fragmentary view similar to FIG. 8 and showing another embodiment of a protective assembly according to the present invention.

FIGS. 8 and 9 show other embodiments of protective insulative assemblies, according to the present invention. The insulative assemblies shown in FIGS. 8 and 9 may be rectangular and used as protective insulative pads or may be joined together to form pouch-shaped structures. Other configurations (not shown) may be formed if desired.

Referring to FIG. 8, a protective insulative assembly, according to the present invention, is indicated by the reference number 71.

The protective insulative assembly 71 includes a first inner funnel layer 72 and a second inner funnel layer 73. The inner layers 72 and 73 are constructed in a manner similar to the inner layer 47 described with respect to the FIG. 4 embodiment. The protective insulative assembly 71 has a solid composite outer layer 74 constructed from coextruded layers 75 and 76. The coextruded layer 75 is an ethylene vinyl acetate while the coextruded layer 76 is a polyethylene film.

Referring to FIG. 9, a protective insulative assembly, according to the present invention, is indicated by the reference number 78. The protective insulative assembly 78 includes a first inner funnel layer 79 and a second inner funnel layer 80. The inner layers 79 and 80 are constructed in accordance with the inner layer 47 described with respect to the FIG. 4 embodiment. The protective insulative assembly 78 has a solid outer composite layer 81. The outer composite layer 81 comprises a reflective layer 82 and an exterior layer 83. In the present embodiment, the layer 82 is heat reflective and comprises an aluminum foil. The exterior layer 83 is a thermoplastic film layer and more specifically as polyethylene film. If desired, the layer 82 may be constructed of other metallized films or from white film such as a polyethylene film pigmented with titanium dioxide.

Figure 10:
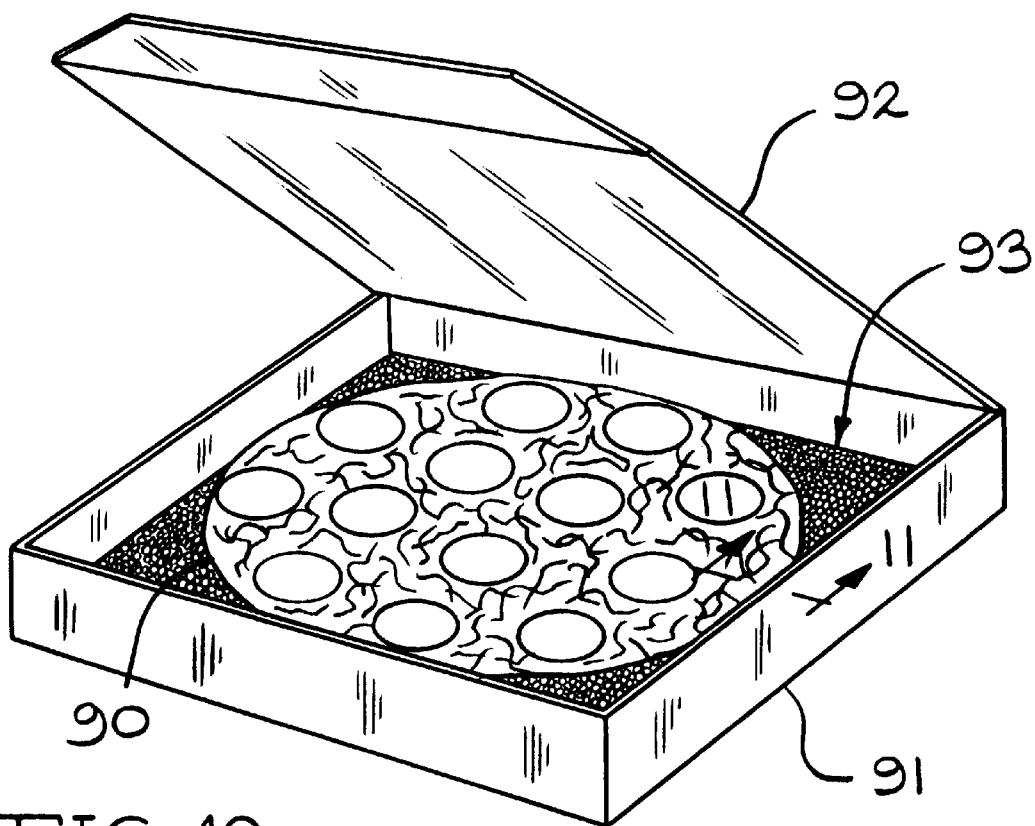
FIG. 10 is a perspective view of a protective insulating blanket, according to the present invention, positioned below a pizza in a box.
Figure 11:
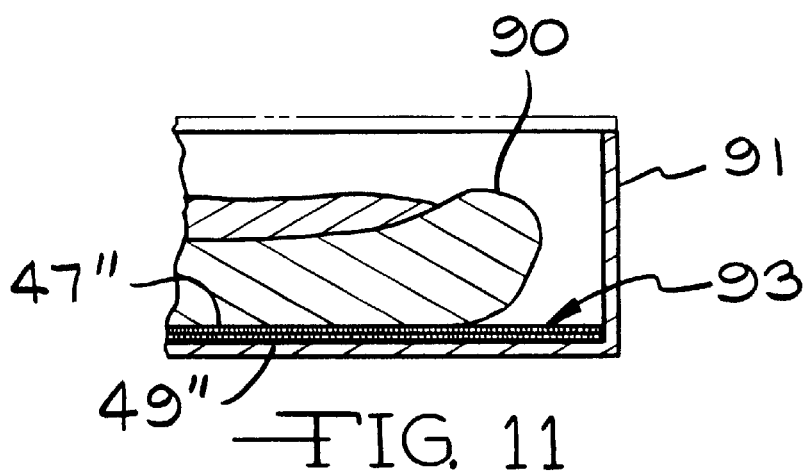
FIG. 11 is a fragmentary cross-sectional view taken along the line 11—11 of FIG. 10.

Another embodiment of the invention is shown in FIGS. 10 and 11. A pizza is generally indicated by the reference number 90 and is positioned within a container 91. The container 91 includes a top 92. A protective assembly 93 serves as an insulative pad being positioned beneath the pizza 90. Similar to the FIGS. 5–6 embodiment, the protective insulative assembly 93 includes at least one inner funnel layer indicated by the reference number 47". Preferably, the protective insulative assembly 93 includes at least two inner layers 47". Similarly, the protective insulative assembly 93 includes a solid outer layer indicated by the reference number 49". The inner layer 47" is similar in construction to the inner layer 47 shown in FIG. 4 and the outer layer 49" is similar in construction to the outer layer 49 shown in FIG. 4. The inner layer 47" and the outer layer 49" are generally rectangularly shaped and are joined at their outer edges to form the unitary and composite protective insulative assembly 93.

The outer solid layer 49 (FIG. 4) may be constructed from many different materials. These include thermoplastic polymer films or sheets, single layer thermoplastic sheets, multiple layer coextruded thermoplastic sheets, multiple layer laminated thermoplastic sheets or like materials.

In addition, one or more layers of a multiple layer outer solid layer 49 can be filled with pigmentation or filled with particulates. The outer solid layer 49 can also be constructed of metal foil material, coated metal foil material or laminated metal foil material. A metal layer may be deposited by a metal deposition process on the outer solid layer 49.

If desired printing or designs and logos may be placed on the outer solid layer 49.

Protective container assemblies, according to the present invention, form a dead airspace of insulation while trapping condensation which may be harmful to the object being protected or from preventing liquid from being forced upwardly or downwardly upon the object being protected.

Numerous revisions may be made to the embodiments of the invention described above, without departing from the scope of the invention or from the following claims.

We claim:

1. A protective assembly comprising, in combination, at least one thermoplastic inner layer and an outer layer, said outer layer being in proximity to said inner layer, said outer layer having a continuous surface, said inner layer having a plurality of interconnected funnels, each of said funnels having a small end and a large end, openings defined by said funnels in said inner layer at said large end, said inner layer being porous with said openings extending through said inner layer, said small end extending toward said outer layer, said outer layer being spaced sufficiently from said inner layer and from said funnels to form a vacant space for receiving gas and liquid, said openings emptying into said space.

2. A protective assembly, according to claim 1, wherein said plurality of interconnected funnels define a plurality of fluid containment pockets.

3. A protective assembly, according to claim 1, wherein said assembly defines a pouch, said assembly including opposed walls joined together to define such pouch and an opening means along one edge of said opposed walls to provide access to the interior of such pouch.

4. A protective assembly, according to claim 1, wherein said outer solid layer is constructed of a thermoplastic sheet.

5. A protective assembly, according to claim 1, wherein said geometric shape of the openings of the funnels and the apertures are polygonal.

6. A protective assembly comprising, in combination, a thermoplastic inner layer having an exposed surface, at least one middle layer and an outer layer, said outer layer having a continuous surface, said outer layer being in proximity to said inner and middle layers, said inner layer having a first plurality of interconnected funnels, each of said funnels having a small end and a large end, an opening defined by each of said funnels in said inner layer at said large end, said inner layer being porous with said openings extending through said inner layer, said small end extending toward said middle layer said middle layer being spaced sufficiently from said inner layer and from said funnels to form a first vacant space for receiving gas and liquid, said openings emptying into said space, and said middle layer having a second plurality of interconnected funnels, each of said funnels having a small end and a large end, an opening defined by said funnel in said middle layer at said large end, said openings extending through said middle layer, said small end extending toward said outer layer said outer layer being spaced sufficiently from said middle layer and from said funnels to form a second vacant space for receiving gas and fluid, said openings emptying into said space, said first and second plurality of interconnected funnels defining a plurality of tortuous paths whereby fluid is retarded from reaching said exposed surface of said inner layer.

7. A protective assembly, according to claim 6, wherein said assembly defines a pouch, said assembly including opposed walls joined together to define such pouch and an opening means along one edge of said opposed walls to provide access to the interior of such pouch.

8. A protective assembly, according to claim 6, wherein said first and second pluralities of interconnected funnels defining a plurality of fluid containment pockets.

9. A protective assembly having a pouch shape, said protective assembly comprising, in combination, opposed walls joined together to form a pouch, opening means along one edge of said opposed walls for inserting or removing an object from within said pouch, each of said walls having at least one thermoplastic inner layer and a solid outer layer, said outer layer being in proximity to said inner layer, said inner layer having a plurality of interconnected tubular protuberances, each of said tubular protuberances having a first end and a second end, an opening defined by said tubular protuberance in said inner layer adjacent said second end, said inner layer being porous with said openings extending through said inner layer, said first end extending toward said outer layer, said outer layer being space sufficiently from said inner layer and from said protuberances to form a vacant space for receiving gas and liquid, said openings emptying into said space.

10. A protective assembly, according to claim 9, including at least two inner layers, each having a plurality of interconnected tubular protuberances.

11. A protective assembly for preserving heat and for trapping condensation comprising, in combination, two or more inner layers constructed of a thermoplastic film and a solid outer layer constructed of a thermoplastic film, said outer layer being in proximity to said inner layers each of said inner layers having a plurality of interconnected funnels, each of said funnels having a small end and a large end, an opening defined by said funnel in said inner layer at said large end, said inner layer being porous with said openings extending through said inner layer, said small end extending toward said outer layer, said outer layer and said inner layers being spaced sufficiently from one another and from said funnels to form at least two vacant spaces for receiving gas and liquid from condensation, said openings emptying into said spaces.

12. A protective assembly, according to claim 11, wherein said inner and outer layers are constructed of polyethylene films.

13. A protective assembly, according to claim 11, wherein said small ends of said funnels are spaced from said large ends of said funnels a predetermined distance.

14. A protective assembly, according to claim 13, wherein said predetermined distance is between 5 mils and 100 mils.

15. A protective assembly, according to claim 14, wherein one of said inner layers includes approximately 400 funnels per square inch and a second one of said inner layers includes approximately 88 funnels per square inch.

16. A protective assembly, according to claim 13, wherein one of said inner layers has a predetermined distance of 20 mils and a second one of said inner layers has a predetermined distance of 50 mils.

17. A bag, which comprises a product compartment defined by walls having at least two-plies of film:
　(a) a nonporous exterior film ply, and
　(b) a porous interior film ply as a bag liner for engagement with a package product, said porous interior film ply having inner and outer surfaces, said outer surface being in proximity to said nonporous exterior film ply, said porous interior film ply and nonporous exterior film ply being spaced sufficiently from one another to form an enclosed vacant fluid reservoir, said porous interior film ply having a plurality of tapered apertures extending from said outer surface of said interior film ply and emptying into said vacant fluid reservoir.

18. The bag of claim 17, wherein the tapered apertures of said porous interior film ply narrow in the direction of the nonporous exterior film ply.

19. The bag of claim 17, wherein the tapered apertures of said porous interior film ply are in the form of protuberances narrowing in the direction of the nonporous exterior film ply.

20. The bag of claim 19, wherein said protuberances of said porous interior film ply have a general conical configuration.

21. The bag of claim 19, for packaging a cooked foodstuff, including pizza.

22. The bag of claim 17, wherein the apertures of said porous interior film ply are in the form of a plurality of regularly spaced protuberances of a configuration which readily permit the transmission of steam, vapor and fluids from the product compartment to the enclosed fluid reservoir while restricting the back flow of liquids from said reservoir to said product compartment.

23. The bag of claim 22, for packaging a cooked foodstuff, including pizza.

24. The bag of claim 17, comprising dual opposing side walls affixed to one another along peripheral edges.

25. The bag of claim 17, comprising opposing quadrilateral side walls and a bottom wall.

26. The bag of claim 17, for packaging a cooked foodstuff, including pizza.

27. A bag for maintaining the crispness of hot cooked foods, which comprises flexible walls conformed into the shape of a food compartment, said walls comprising a nonlaminated multi-ply film composite comprising:
    (a) a nonporous exterior film ply, and
    (b) a porous non-absorbent bag liner ply having an inner surface for engaging with cooked foods in said food compartment and an outer surface spaced from said nonporous exterior film ply to form an enclosed vacant fluid reservoir between said nonporous exterior film ply and porous non-absorbent bag liner ply, said porous non-absorbent bag liner ply having a plurality of regularly spaced apertures for communication of said food compartment with said fluid reservoir, said apertures being of a configuration as to readily allow transmission of steam and oily liquids from said food compartment to said fluid reservoir while minimizing the back flow of oily liquids and condensate from said reservoir to said food compartment.

28. The crispness bag of claim 27, wherein said apertures of said porous non-absorbent bag liner ply are in the form of tapered protuberances narrowing in the direction of said nonporous exterior film ply.

29. The crispness bag of claim 27, wherein said apertures of said porous non-absorbent bag liner ply have a general conical configuration narrowing in the direction of said nonporous exterior film ply.

30. The bag of claim 29, for packaging a cooked foodstuff, including pizza.

31. The crispness bag of claim 27, comprising dual opposing side walls affixed to one another along peripheral edges.

32. The crispness bag of claim 27, comprising opposing quadrilateral side walls.

33. The bag of claim 27, for packaging a cooked foodstuff, including pizza.

34. A bag for maintaining the crispness of hot foods cooked in oil/fat, which comprises flexible walls conformed into the shape of a food compartment, said walls comprising a nonlaminated multi-ply film composite comprising:
    (a) a nonporous exterior film ply, and
    (b) a porous non-absorbent bag liner ply having an inner surface for engaging with cooked foods in said food compartment and an outer surface spaced from said nonporous exterior film ply to form an enclosed vacant fluid reservoir between said nonporous exterior film ply and porous non-absorbent bag liner ply, said porous non-absorbent bag liner ply having a plurality of apertures which readily permit the transmission of residual oil and steam from the food to the fluid reservoir while limiting the back flow of collected cooled oil and condensation from the reservoir to the food compartment.

* * * * *